United States Patent
Greenwood et al.

(10) Patent No.: US 10,594,620 B1
(45) Date of Patent: Mar. 17, 2020

(54) BIT VECTOR ANALYSIS FOR RESOURCE PLACEMENT IN A DISTRIBUTED SYSTEM

(71) Applicant: Amazon Technologies, Inc., Seattle, WA (US)

(72) Inventors: Christopher Magee Greenwood, Seattle, WA (US); Gary Michael Herndon, Jr., Seattle, WA (US); Mitchell Gannon Flaherty, Seattle, WA (US); Surya Prakash Dhoolam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 15/078,856

(22) Filed: Mar. 23, 2016

(51) Int. Cl.
| | |
|---|---|
| *H04L 29/08* | (2006.01) |
| *G06F 9/50* | (2006.01) |
| *H04L 12/911* | (2013.01) |
| *G06F 9/455* | (2018.01) |
| *G06F 11/00* | (2006.01) |

(52) U.S. Cl.
CPC ............ *H04L 47/70* (2013.01); *G06F 9/5083* (2013.01); *H04L 67/10* (2013.01); *G06F 9/505* (2013.01); *G06F 11/008* (2013.01); *G06F 2009/4557* (2013.01)

(58) Field of Classification Search
CPC ...... G06F 3/0653; G06F 11/008; G06F 9/505; G06F 9/5083
See application file for complete search history.

(56) References Cited

U.S. PATENT DOCUMENTS

| | | | |
|---|---|---|---|
| 7,426,570 B2 | 9/2008 | Andrzejak et al. | |
| 8,782,242 B2 | 7/2014 | Ahmad et al. | |
| 8,856,386 B2 | 10/2014 | Dutta et al. | |
| 2005/0081024 A1* | 4/2005 | Khatri | G06F 8/64 713/100 |
| 2011/0044320 A1* | 2/2011 | Flockhart | H04M 3/5232 370/352 |
| 2013/0097601 A1 | 4/2013 | Podvratnik et al. | |
| 2013/0155902 A1* | 6/2013 | Feng | H04L 67/1031 370/255 |
| 2013/0290539 A1 | 10/2013 | Kodialam et al. | |
| 2014/0068608 A1* | 3/2014 | Kulkarni | G06F 9/45558 718/1 |

(Continued)

OTHER PUBLICATIONS

U.S. Appl. No. 14/643,479, filed Mar. 10, 2015, Christopher Magee Greenwood et al.

*Primary Examiner* — Tom Y Chang
(74) *Attorney, Agent, or Firm* — Robert C. Kowert; Kowert, Hood, Munyon, Rankin & Goetzel, P.C.

(57) ABSTRACT

A distributed system may implement analyzing bit vectors for resource placement. Bit vectors may be maintained or generated for currently hosted resources in a distributed system according to placement criteria so that individual bit values of a bit vector indicate whether a corresponding one of the placement criteria is satisfied for the current placement of the resource. A resource may be identified for migration and a possible placement determined for the resource. A bit vector may be generated for the possible placement and compared with the bit vector for the current placement of the resource to determine whether the possible placement improves the placement of the resource with respect to the placement criteria.

20 Claims, 9 Drawing Sheets

(56) References Cited

U.S. PATENT DOCUMENTS

2014/0258245 A1 9/2014 Estes
2015/0039629 A1 2/2015 Theeten et al.
2015/0355924 A1* 12/2015 Holla ................. G06F 9/45558
　　　　　　　　　　　　　　　　　　　　　　　　　　　　　718/1

* cited by examiner

US 10,594,620 B1

BIT VECTOR ANALYSIS FOR RESOURCE PLACEMENT IN A DISTRIBUTED SYSTEM

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage or other virtual computing resources, various different placement optimizations and/or constraints may be implemented in order to provide performance guarantees. When placing resources amongst resource hosts, selecting from among different placement options that satisfy the optimizations and/or constraints to place storage may prove challenging. Moreover, the impact of placement decisions upon resource hosts themselves may be difficult to discern.

Figure 1:
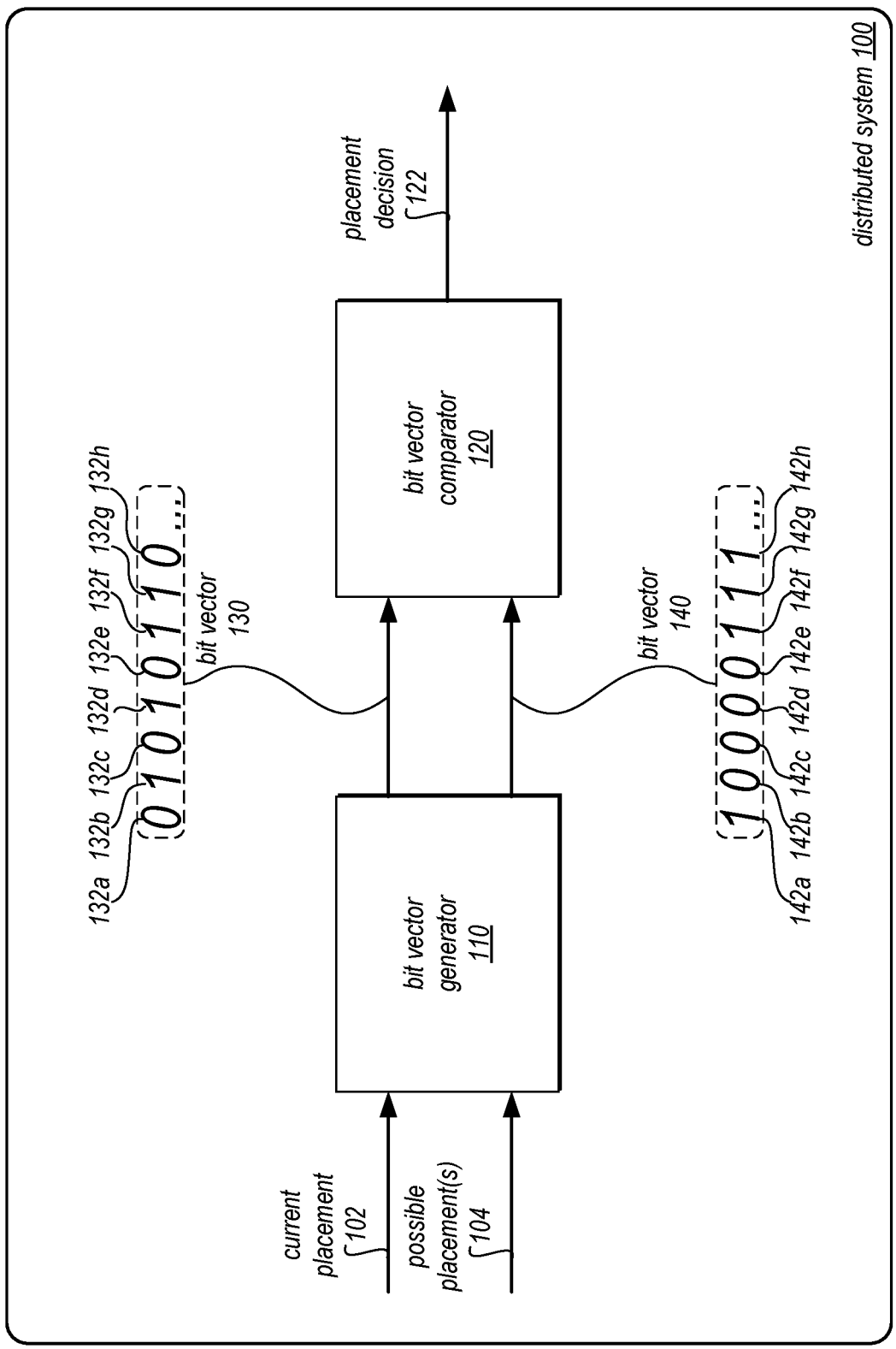
FIG. 1 illustrates a logical block diagram of bit vector analysis for resource placement in a distributed system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement bit vector analysis for resource placement in distributed systems. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Placement decisions may be made to locate the resources at different resource hosts during creation. For example, when a request to place a new resource in the distributed system is received, available resource hosts in the distributed system may be evaluated to identify an optimal placement for the resource. In some circumstances, optimal locations may not be available and the resource may be placed regardless. Thus, in some embodiments, migration operations may be later performed to improve the placement of resources at different locations in the distributed system.

Placement decisions for initial placements or migrations may be made according to placement criteria, in some embodiments. Placement criteria may be used to determine a best or optimal placement location for an individual resource, as well as for placement of resources across the distributed system as a whole. For example, in order to provide or improve availability, durability, and/or other performance characteristics of resources, placement criteria may be used to determine particular locations at which resources should be placed (e.g., different infrastructure zones such as network router or brick). If no such location is available, then the placement criteria may indicate a less optimal location to place the resource (e.g., a resource host that is in a less efficient infrastructure zone, such as a different network router or brick than another resource with which the placed resource communicates). Placement criteria may include, but are not limited to, a configuration of the resource along with other resources if part of a distributed resource (e.g., multiple copies of a data object or a copy of a data object and a client of the data object), available bytes, IOPs, or slots, a resource utilization balance, such as bytes to IOPs balance, impact on capacity fragmentation, hardware/software characteristics of resource hosts, and/or various desired location-based configurations.

Evaluating resource placement criteria for current or possible placements of a resource can be challenging. Distributed systems that perform placement and migration operations can create a dynamic environment that makes analysis of placement criteria subject to changing conditions. Moreover, the inclusion of many different criterion or other considerations within placement criteria may make it difficult to predict the behavior of systems that analyze and make placement judgements based on the evaluation of multiple placement criteria. Bit vectors may be implemented in various embodiments to provide a deterministic representation of placement criteria so that placement decision making may behave deterministically (as opposed to other criteria representation schemes that result in more random or stochastic placement decision making). In this way, placement decision making can become predictable, which may allow for adapting, changing, or tuning placement decision making in different scenarios without introducing unintended consequences.

FIG. 1 illustrates a logical block diagram of bit vector analysis for resource placement in a distributed system, according to some embodiments. Distributed system 100 may implement various resource hosts or other infrastructure to implement resources on behalf of clients of distributed system 100. Such resources can include various storage, networking, processing, or other computing resources, such as data volumes implemented by block-based storage service 220 or virtual compute instances implemented by virtual compute service 230 discussed in FIG. 2 below). Resource hosts, which may be one or more computing systems, nodes, or devices (e.g., system 1000 in FIG. 9 below) may be configured to host or implement a resource of the distributed system.

To implement bit vector analysis for placing resources, distributed system 110 may implement bit vector generator 110 to generate, determine, or otherwise obtain bit vectors describing the placement of resources according to a set of placement criteria and bit vector comparator 120 to perform comparative analysis between bit vectors for different placements of a resource at resource hosts in distributed system 100 in order to make a placement decisions 122. Consider an example scenario where a resource is to be migrated from a current placement to a new placement. As illustrated in FIG. 1, a current placement indication 102 and possible placement(s) indication(s) 104 may be provided to bit vector generator 110. To generate bit vectors for the respective placements, bit vector generator 110 may obtain and evaluate state, performance, and other information describing current placement 102 and possible placement(s) 104 with respect to placement criteria.

For instance, placement criteria may include such considerations or criterion as: (a) whether a resource host is overburdened (e.g., hot); (b) whether a resource host is configured in a certain manner (e.g., a server connected to particular server rack or networking device); (c) whether hosting the resource at a resource host decreases distributed system 100 capacity according to an infrastructure constraint (e.g., reducing a possible number of diverse pairings of server rack pairings); and so on. Bit vector generator 110 may obtain information describing current placement 102 and determine whether each placement criterion is satisfied. The individual results of each placement criterion may be recorded or identified as bit values, where a value of "1" indicates that a criterion is satisfied and a value of "0" indicates that a criterion was not satisfied, and placed into a single vector containing the results of evaluating each criterion. Thus, bit value 132a indicates whether a placement criteria mapped to the most significant bit of bit vector 130 is satisfied, bit value 132b indicates whether a placement criteria mapped to the most significant bit of bit vector 130 is satisfied, and so on. Mapping information may be utilized so that individual characteristics about a resource, resource host, or other component of distributed system 100 may be determined based on the mapped placement criterion to the different bit values. In one example, specific bit values may be read to determine the state of a resource with respect to a mapped placement criterion (e.g., determining whether a server is hot or not by accessing the bit value in a bit vector for a resource hosted by the resource host), providing a quick and efficient health status for the resource host.

As noted above, bit vectors may provide a deterministic representation of placement criteria which bit vector comparator 130 may utilize so that a comparison between bit vectors may always reach a same result as to which placement is better. In order to provide a deterministic representation, the ordering or mapping of bit values may be the same for each bit vector describing a different resource placement or possible placement. Moreover, the ordering of bit values within the bit vector may provide a strict weighting scheme so that comparisons between different bit vectors may reach the same result. For instance, the most significant bit value may be the most significant criteria that carries the highest weight for determining optimal placement. If two bit vectors with such a strict weighting scheme were compared, even if the bit vector for a first placement only had the most significant bit set (e.g., value of "1") and no other bit were set and a second placement had every bit set in the bit vector except for the most significant bit value, the first placement would be considered more optimal (even though every other placement criteria was satisfied by the second placement). By imposing a strict weighting scheme on the bit values of the bit vector, the effect of prioritizing a placement criterion ahead of another placement criterion may be easily discernable as placements that are performed by comparing bit vectors that included such a priority will always enforce that priority. Such a scheme allows for the selection of placement criterion and prioritizing of the placement criterion to tuned to achieve different placement results. For example, in some embodiments, mapping information may be modified to add or remove placement criterion, change placement criterion, or change the ordering of bit values mapped to placement criterion.

Consider again the migration scenario illustrated in FIG. 1. A deterministic comparison may be made between bit vector 130 for current placement 102 and bit vector 140 for possible placement 104 by comparing which of the two bit vectors results in a greater value. The comparison between bit vectors can be performed in different ways. For example, bit vector 130 and bit vector 140 can be transformed into other numeric representations (e.g., decimal values) without losing the described information and then various comparison operations performed, such as calculating the difference between the representations. The difference value may provide a quantifiable difference or improvement between the placements (which may be used to compare multiple possible migrations and select a migration with a greatest improvement). If for instance, the difference between bit vector 130 and bit vector 140 is a positive value, and the different between bit vector 130 and another bit vector is a negative value, then it may be determined that the placement represented by bit vector 140 improves the placement of the resource (e.g., due to the positive difference), whereas the other possible placement is less optimal than the current placement (e.g., due to the negative difference). Comparisons may also be made between multiple possible placements to determine the placement the greatest improvement (e.g., the highest positive difference value).

In addition to providing deterministic comparative analysis, bit vector representations describing resource placements may be utilized to reason over large numbers of current resource placements to determine various health and other judgments concerning the state of distributed system 110. For instance, the number of resources that have a particular bit set, such as the most significant bit, may be identified out of the total number of resources in the distributed system. In some embodiments, averages of a bit vector numeric representation, such as a decimal value generated from the bit vector, may be used to quantify the overall optimality of placements within a group of resources (e.g., resources in a particular infrastructure locality or zone, such as a server rack, data center room, or network locality). In at least some embodiments, statistics and other analyses may be performed over groups of bit vectors for resources to dynamically change how resource placements and/or migrations are performed, such as discussed below with regard to FIGS. 6-8.

Please note that previous descriptions are not intended to be limiting, but are merely provided as an example of bit vector analysis for resource placement. Various components may perform bit vector analysis. Moreover, different numbers or types of placement criteria (e.g., numbers of bits in a bit vector) may be used.

This specification begins with a general description of a provider network, which may implement bit vector analysis for resource placement offered via one or more network-based services in the provider network, such as bit vector analysis for placing and/or migrating data volumes offered via a block-based storage service. Then various examples of a block-based storage service are discussed, including different components/modules, or arrangements of components/module that may be employed as part of utilizing bit vector analysis for volume placement of data volumes in the block-based storage service. A number of different methods and techniques to implement bit vector analysis for resource placement are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
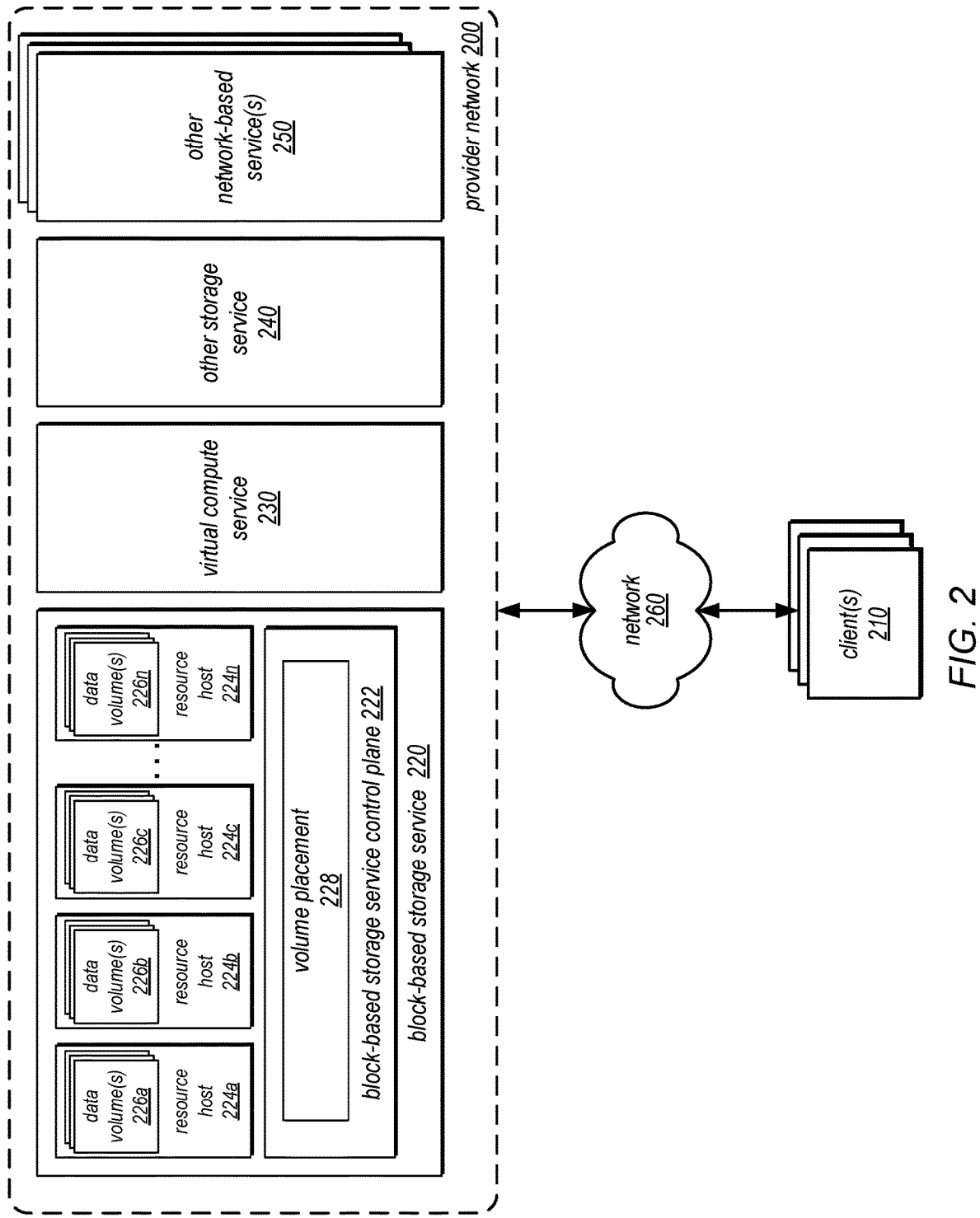
FIG. 2 is a block diagram illustrating a provider network that includes multiple network-based services such as a block-based storage service that implements bit vector analysis to perform resource placement and resource migration, according to some embodiments.

FIG. 2 is a block diagram illustrating a provider network that includes multiple network-based services such as a block-based storage service that implements bit vector analysis to perform resource placement and resource migration, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc.... and (in the case of reserved compute instances) reservation term length.

In various embodiments, provider network 200 may also implement block- based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240.

Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane 222 may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
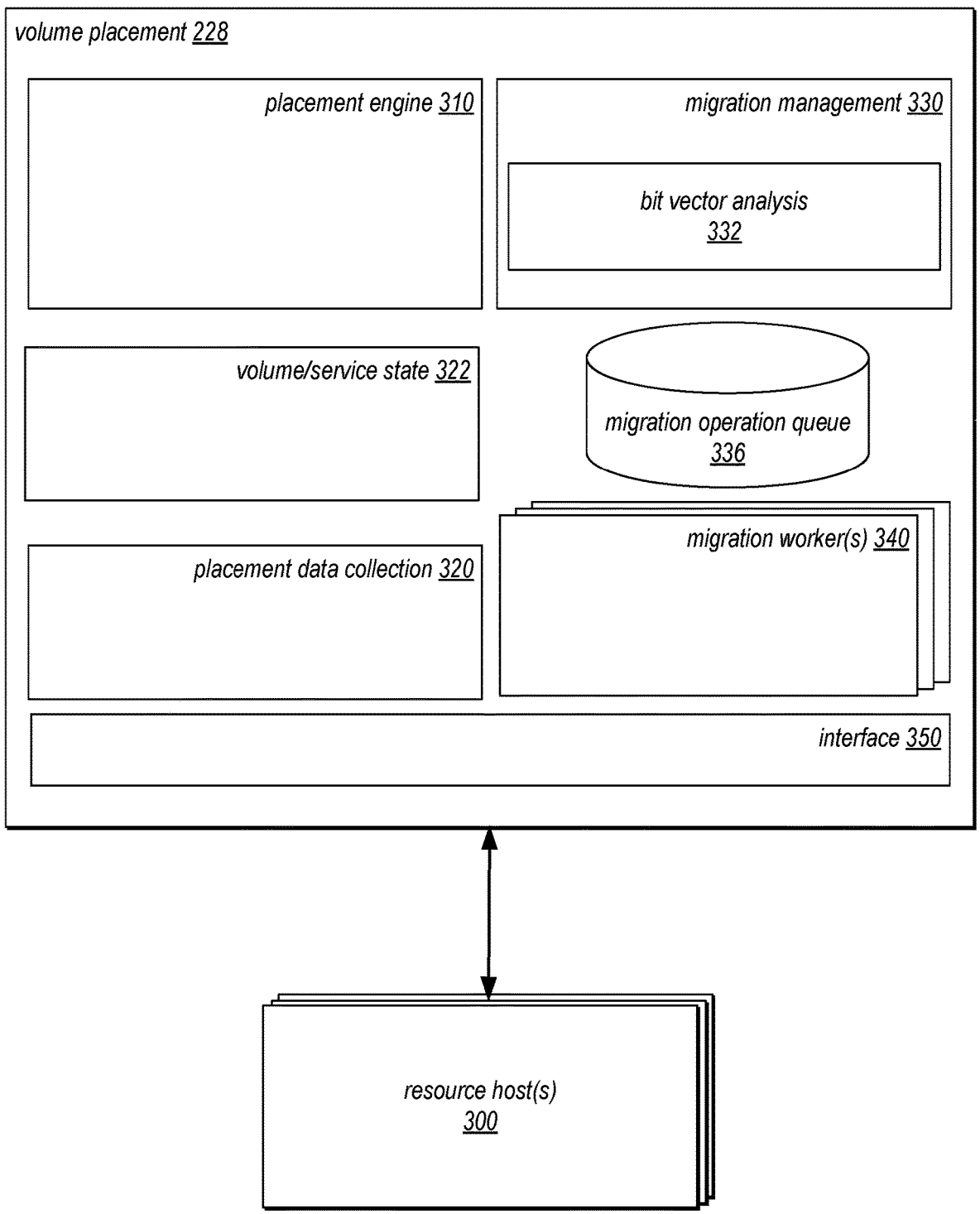
FIG. 3 is a logical block diagram illustrating volume placement that implements bit vector analysis to optimize resource placement, according to some embodiments.

FIG. 3 is a logical block diagram illustrating volume placement that implements bit vector analysis to optimize resource placement, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 9). Each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as interne small computer system interface (iSCSI).

Resource hosts may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a resource host (and replicas of data volumes implemented on the resource host) may be within multiple different types of infrastructure zones, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 9). In at least some embodiments, volume placement 228 may implement placement data collection 320 to collect information, metrics, metadata, or any other information for performing volume placement. Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, placement data collection 320 may aggregate the data according to infrastructure zones, partitions, resource hosts, or other granularities for block-based storage service 220. In some embodiments, placement data collection 320 may generate respective bit vectors according to a bit mapping that maps bit values in the bit vectors to individual placement criteria and store the bit vectors for the data volumes in volume service state 322. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226, such as discussed below with regard to FIG. 5.

Volume placement 228 may implement placement engine 310, in various embodiments. Placement engine 310 may perform various kinds of analysis to identify placement locations for resources, such as replicas of new data volumes or migrating currently placed data volumes. Analysis may be performed with respect to the placement criteria to determine placement locations which may be optimal for individual resources, or for the block-based storage service as a whole. For instance, placement engine 310 may implement configuration analysis to evaluate prospective placement configurations of all of the resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume). Configuration analysis may consider the impact of migrating currently placed resources to other resource hosts in order to free up space at resource hosts that would provide better configurations for other resources of a distributed resource. For example, this could include moving a slave volume (e.g., the resource) to another resource host to make room for a different slave volume at that host, which would make the different slave volume in the same infrastructure zone as a master of the volume or a client of the volume. In some circumstances, this configuration (e.g., having the master or slave volume in the same infrastructure zone, such as being connected to the same network router, as the client) provides improved performance and may be an optimal configuration.

In response to receiving a placement request at placement engine 310, configuration analysis may determine prospective placements by accessing volume/service state 322. Those resource hosts which are available, and which do not violate any placement constraints may be evaluated (e.g., two partitions of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive). Prospective placement configurations may be generated or identified based on the available resource hosts for the resource. Other replicas of the data volume may be evaluated based on actual or hypothetical placement locations.

One or more infrastructure zone localities may be determined for the different prospective placement configurations of a distributed, in various embodiments, based on volume/service state 332. For instance, metadata may indicate which network bricks or routers the resource hosts of different replicas of a data volume are connected to. In at least some embodiments, a score may be generated for the infrastructure zone locality of a prospective placement configuration (where the resource to be placed is located at a different available resource host). Placement engine 310 may perform configuration analysis upon many other metrics, data, or considerations besides infrastructure zone localities. For example, in at least some embodiments, an analysis may be performed on prospective configurations with respect to different performance metrics of the resource hosts hosting the replicas of a data volume. For example, storage capacity, workload, or Input/Output Operations per second (IOPs), may be evaluated for the data volume as a whole. Some data volumes may be partitioned so that different partitions maintain different portions of data for a data volume. For example, a data volume may be partitioned into 3 sets of master-slave replica pairs. Configuration analysis may be performed based on the placement configuration for each portion of the data volume that is replicated (e.g., each master-slave replica pair) or all of the data volume partitions (e.g., all 3 of the master-slave replica pairs).

Placement engine 310 may implement other analyses to determine partition placements. For example, scores may be generated for placements based on the last time a particular resource host was contacted or heard from. Analysis may be performed to identify and prevent multiple master-slave replica pairs from being placed on the same two resource hosts. In some embodiments, resource host fragmentation analysis may be performed, to optimize placement of resources on resource hosts that can host the partition and leave the least amount of space underutilized. As with configuration analysis above, the example analysis given above may be performed to determine placement locations for some resources which if migrated would may provide better placement of other resources that were not moved. Although not illustrated in FIG. 3, placement engine 310 may implement bit vector analysis for generating placement recommendations for initial placements of data volumes.

In some embodiments, volume placement 228 may implement migration manager 330. Migration manager 330 may dynamically or proactively migrate currently placed resources (e.g., volume replicas) from one resource host to another resource host so that the placement for the resource (e.g., data volume) is more optimal and/or placement of resources amongst the resource host(s) 310 is more optimal as a whole (even if the migration results in a same or less optimal new placement for the migrated resource). For example, migration manager 330 may implement bit vector analysis 332 according to the various techniques discussed above with regard to FIG. 1 and below with regard to FIGS. 6-8 to determine placement locations that improve the placement of a currently placed data volume with respect to the placement criteria. Bit vector analysis 332 may also determine which placements if performed would exceed a migration optimization or other improvement threshold (e.g., based on a difference value calculated for the migration between a current and possible placement). For those resources with possible placements that would exceed the placement optimization threshold, migration management 330 may place a migration operation for the data volume in migration operation queue 336. In some embodiments, migration management 330 may assign a priority to migration operations based on the bit vectors of the resources identified for migration.

Migration operation queue 336 may be maintained in persistent storage, such as distributed or centralized data store. In at least some embodiments, a database system or other storage system that provides transaction controls may be utilized to maintain migration operation queue 336. For example, migration operation queue 336 may be maintained as a database table in another network-based service, such as a NoSQL data store implemented as part of other storage service 240. Migration management 330 may update migration operation queue 336 periodically, according to the various techniques described below with regard to FIGS. 6-8. Various metadata and information for a migration operation may be maintained, such as a volume identifier, location of a destination host, state, time of last update, and/or priority value.

Migration management 330 may also remove migration operations from queue 336, such as those migration operations identified as complete or failed. Those migration operations that have not yet been performed may have updated priorities stored in the queue (e.g., raising or lowing the priority value). Time of last update may indicate when an update to the migration operation in the queue was last made. For example, if a migration operation has a later update time than other migration operations, the migration operation may be considered to have more recent/relevant data. In at least some embodiments, migration operation queue 336 may be implemented as a priority queue, and thus the highest priority migration operation may be selected for performance.

Figure 4:
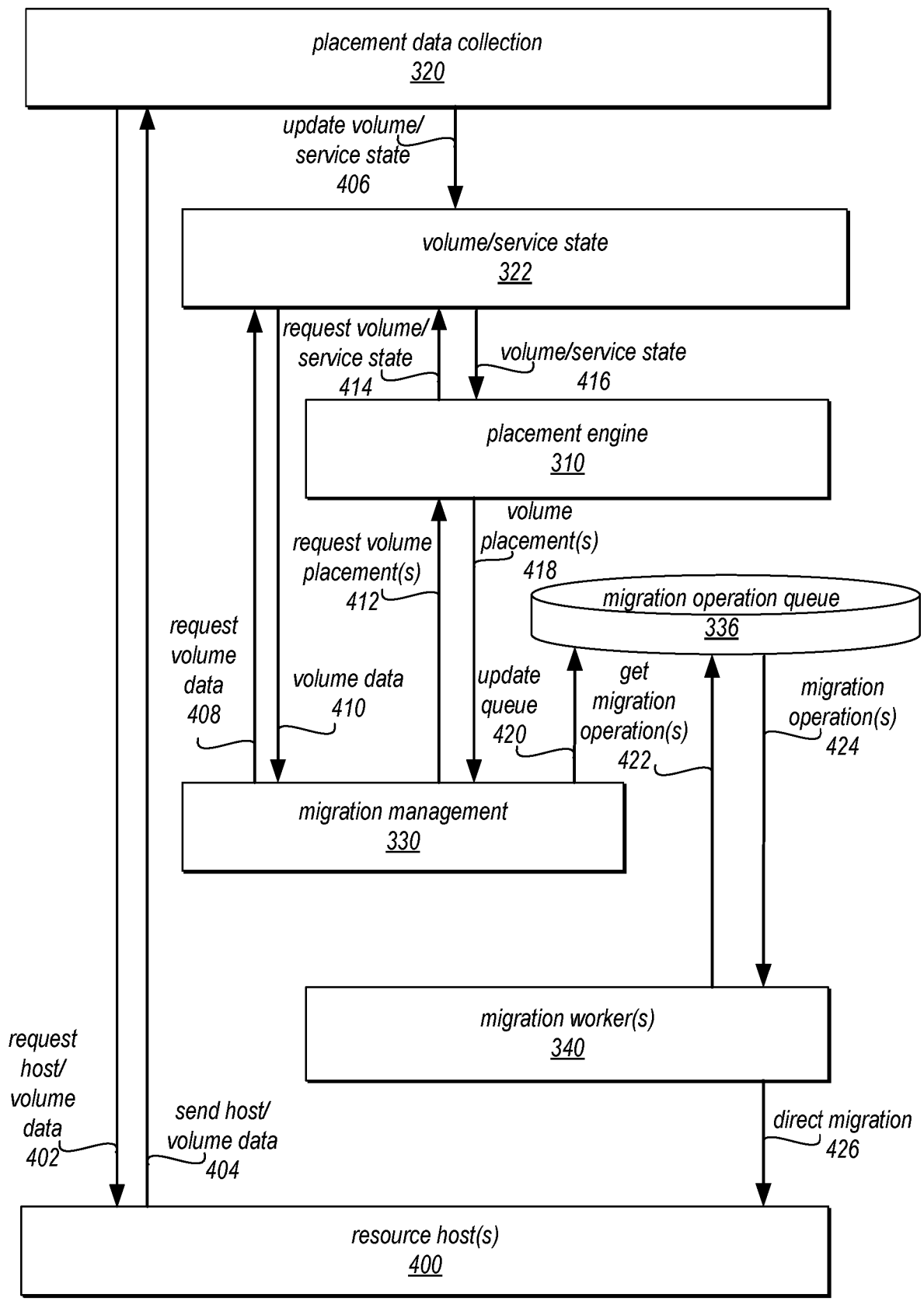
FIG. 4 is a logical block diagram illustrating interactions for migrating data volumes in a block-based storage service, according to some embodiments.

Migration worker(s) 340 may be implemented to perform migration operations. Migration worker(s) 340 may send a request to opportunistic placement manger 330 for a migration operation to perform, or as illustrated in FIG. 4 may directly obtain a migration operation from queue 336. Migration manger 330 may pull a migration operation from migration operation queue 336 and assign the migration operation to a migration worker 340 to direct. Migration worker(s) 340 may, in some embodiments, update metadata for a migration operation in migration operation queue 336 (e.g., to change state from "ready" to "in progress").

In various embodiments, migration worker 340 may request an updated placement for a resource that is to be migrated from placement engine 310, which may perform the various techniques discussed above and below to provide a new placement location for the resource.

FIG. 4 is a logical block diagram illustrating interactions for migrating resources (e.g. replicas of data volumes), according to some embodiments. As discussed above, placement data collection 320 may sweep or request host/volume data 402 from resource host(s) 400 in order to update volume service state 322. Resource host(s) 400 may send host/volume data 404 to placement data collection 320, which may aggregate and/or update volume/service state 406, including storing bit vectors for the data volumes. Migration management 330 may request volume data 408 from volume/service state 310 and may receive in return volume data 410, which may include bit vectors, in order to select data volumes for migration.

Once a resource is selected for migration, migration management 330 may request volume placement(s) 412 from placement engine 310, which perform the various analyses discussed to above to provide possible volume placement(s) by request volume service state 414 from volume service state 310 and analyzing the returned volume/service state 416. Placement engine 310 may then determine placement locations, such as according to the techniques described above with regard to FIG. 3. Volume placement(s) 418 may be provided to migration manager 330. For those volumes (or resources) that exceed the migration optimization threshold, migration operation queue 420 may be updated to add new migration operations. Stale or completed migration operations may be removed from the migration queue 336.

Migration worker(s) 340 may get migration operations 422 from migration operation queue 336 which may return or provide migration operations 424 to migration worker(s) 340. Migration worker(s) 340 may then direct the migration operation 426 to affected resource host(s) 400. In some embodiments, migration worker(s) 340 may act as intermediaries, and may obtain the resource from an originating resource host before sending the resource to the destination resource host. The various interactions and illustrations provided in FIG. 4 may be communicated using various standard or customized communication techniques. For example, various internal APIs for placement engine 310, opportunistic placement management 330, migration operation queue 336, volume service state 322, resource host(s) 400, etc., may each have respective interfaces (e.g., programmatic interfaces such as an API), and the respective communications in FIG. 4 may be formatted accordingly.

Figure 5:
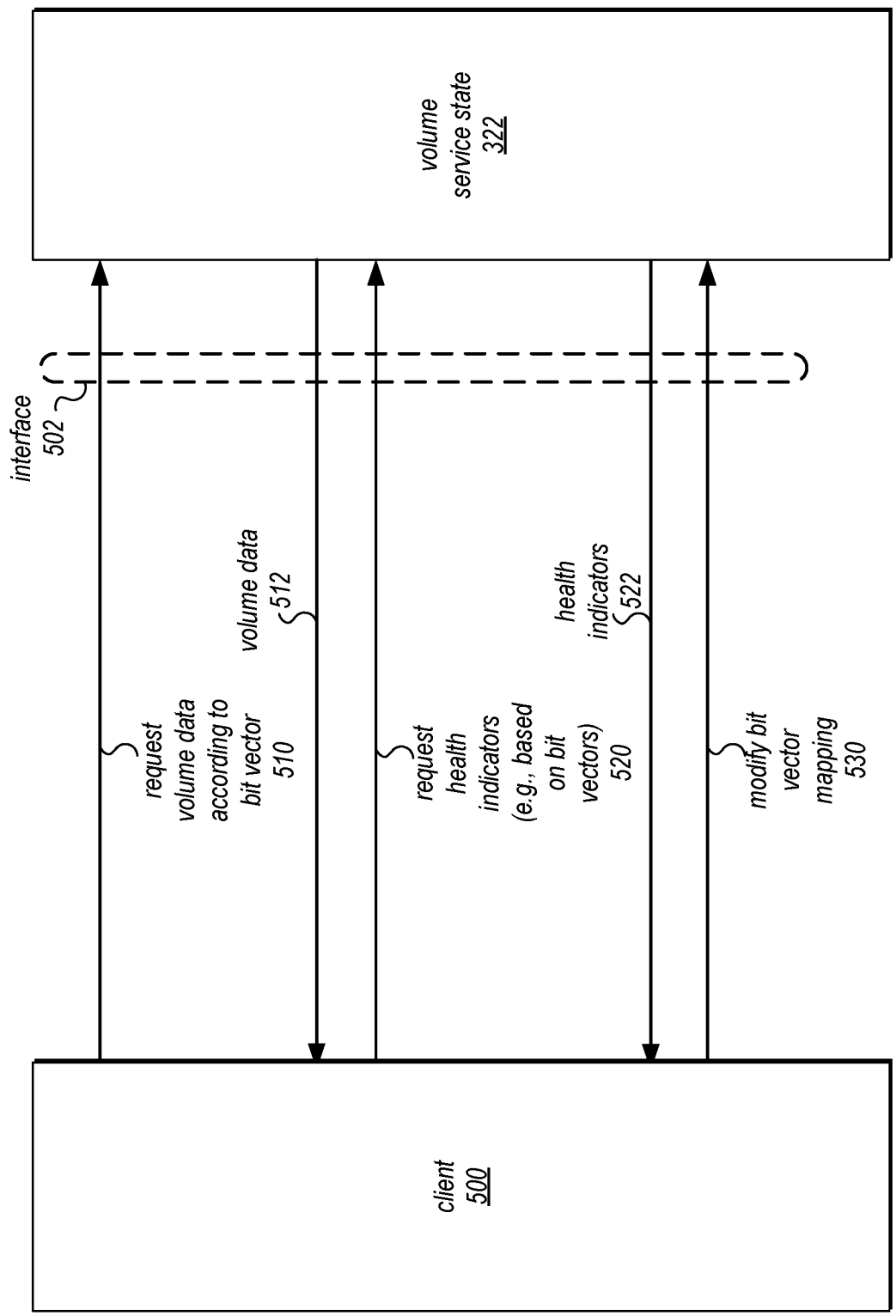
FIG. 5 is a logical block diagram illustrating interactions between a client and a volume/service state for performing and managing bit vector analysis, according to some embodiments.

FIG. 5 is a logical block diagram illustrating interactions between a client and a volume/service state for performing and managing bit vector analysis, according to some embodiments. In some embodiments, volume service state 322 may implement an interface, such as interface 502, providing clients 500 (e.g., migration manager, operators, etc.) with capability to query and obtain volume data according to bit vectors. For instance, request 510 for volume data may specify one or more bit values in bit vector that are either set or not set, so that volume service state 322 may return data volume data 512 for those data volumes with bit vectors that match the specified bit value predicates included in the request. In at least some embodiments, volume service state may generate health indicators or statistics based on bit vectors for groups of data volumes (e.g., data volumes in a particular infrastructure zone, locality, or unit, such as data volumes in a particular availability zone). Volume service state 322 may locate the bit vectors for the data volumes in the group and generate the statistics (e.g., percentage, average, rate of change, etc.) and return health indicators 522. In some embodiments, health indicators 522 may then be compared with projected or estimated health indicators that would occur as a result of migrating all of the data volumes in a particular infrastructure locality (e.g., zone, data center, or room) to a more optimal location. For instance, a health indicator 522 may be a distribution of bit vector values for data volumes in a data center. Placement recommendations may then be determined for each of the data volumes, and projected bit vectors generated for each of the placement recommendations. A projected distribution of the projected bit vectors may then be determined and compared with the health indicator 522 that is a distribution of bit vectors to determine a capacity for improving placement of the data volumes with respect to resources.

In at least some embodiments, a request 530 may be made to modify bit mapping information for bit vectors. Volume service state 322 may then update maintained bit vectors for the data volumes according to the new mapping information and/or instruct placement data collection 320 or other component that generates the bit vectors of the modification to the bit mapping information. The modification request 530 may change the ordering of placement criteria mapped to the bit values (and thus the weighting of the placement criteria, in some embodiments. The request may also change the number of placement criteria, adding or removing placement criteria from the bit vector, in some embodiments. In this way, the definition of an optimal placement may be changed so that comparisons with respect to bit vectors determine improvement according to the changed definition of optimal placement.

Figure 6:
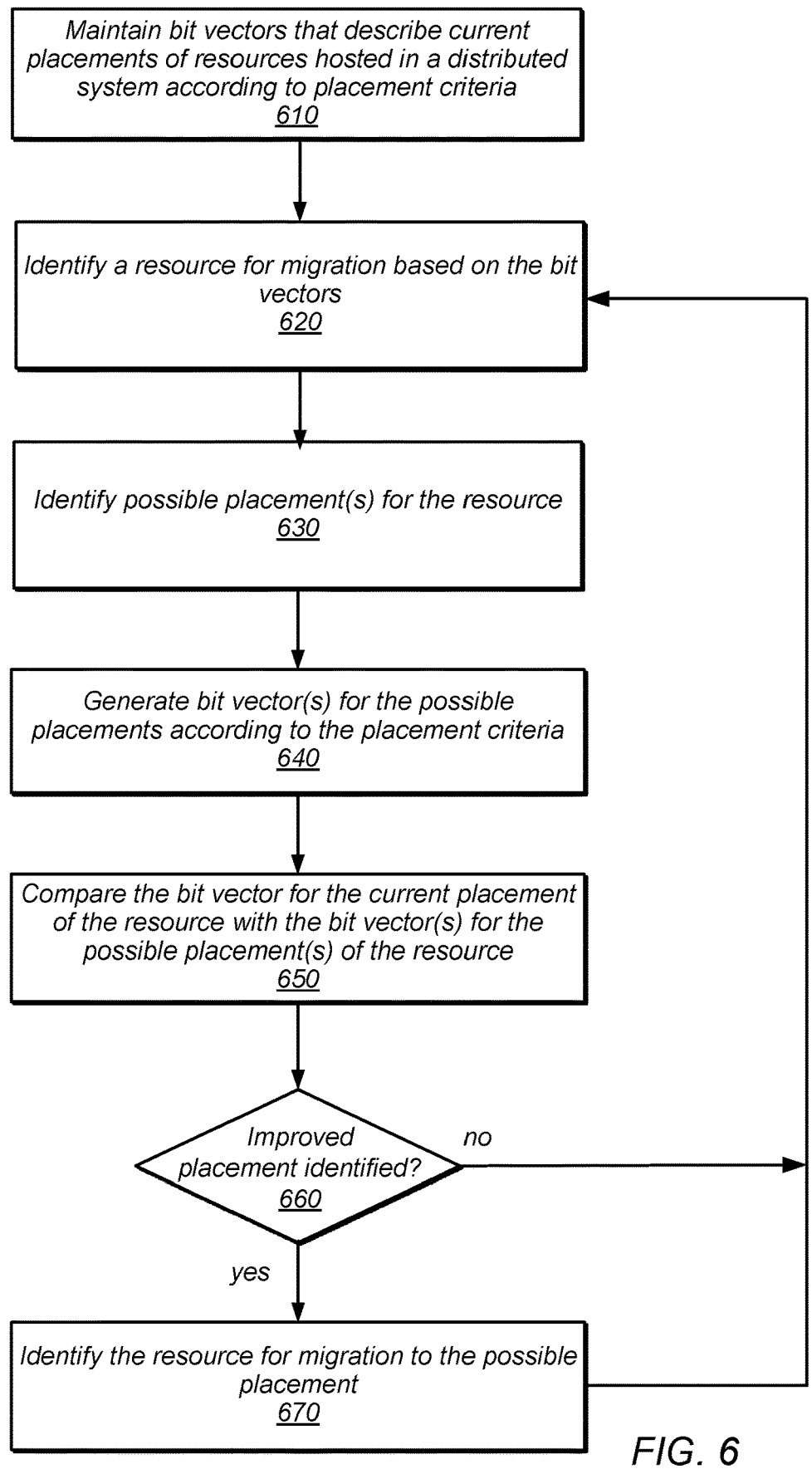
FIG. 6 is a high-level flowchart illustrating various methods and techniques to implement bit vector analysis for resource placement, according to some embodiments.

The examples of bit vector analysis for resource placement discussed above with regard to FIGS. 2-5 have been given in regard to a block-based storage service and/or other network-based services. Various other types or configurations of distributed systems placing resources of distributed resources at resource hosts may implement these techniques. For example, a backup or archive distributed storage system may determine more optimal placements for currently placed data utilizing bit vector analysis. Different configurations of the various modules, components, systems, and or services described above that may implement bit vector analysis for resource placement may be configured to determine bit vectors for different placements, compare the bit vectors and determine whether migration or placement should be performed. FIG. 6 is a high-level flowchart illustrating various methods and techniques to implement bit vector analysis for resource placement, according to some embodiments. These techniques may be implemented using a control plane, migration manager or other component for placing resources at currently placed at other resource hosts in a distributed system or for placing new resources in a distributed system, as described above with regard to FIGS. 2-5.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2-5 may be a distributed resource that is implemented as a master replica and one or more replica slaves. When evaluating placement criteria, the location of client systems or devices for resources may also be considered (e.g., wither a data volume client, such as a compute instance described above with regard to FIG. 2 is connected to the same network router, located in the same room in the data center, etc.). Initial placement of resources at resource hosts may be performed to create and/or place a new resource at one or more resource hosts of a distributed system according to placement criteria. Migration may be performed to move currently placed resources to a different placement in the distributed system that improves the placement of the resource host.

As indicated at 610, bit vectors may be maintained for current placements of resources hosted at different resource hosts of a distributed system. As discussed above with regard to FIG. 1, different bit values within the bit vector may indicate whether a placement criterion is satisfied for the current placement. The bit values may be mapped to the different placement criterions of placement criteria so that a strict weighting scheme may be implemented when comparing bit vectors. Placement criteria may be various analyses, examinations, calculations, to determine the desirability or optimality of placement of a resource at a resource host and/or placement of resources amongst resource hosts as a whole (even if an individual placement may be less than optimal). In at least some embodiments, placement criteria may be represented in binary fashion, either satisfied (e.g., true) or not satisfied (e.g., false). For instance, placement criteria may evaluate resource utilization (e.g., storage resources, processing resources, networking resources, etc.) at a resource host to determine if the resource utilization exceeds a threshold (e.g., 80%). Different bit values can describe different thresholds for the same criteria (e.g., one bit value indicates whether 40% utilization is exceeded, another bit value indicates whether 75% utilization is exceeded), so that different scenarios, levels, or characteristics for the same type of placement criteria may be represented (even though individual bit values may only provide binary information, true or false, with respect to a threshold or state).

In some embodiments, placement criteria may describe various states of a distributed resource, such as the configuration of the resource as it is currently placed at resource hosts. Consider the scenario where a resource includes multiple copies or participants (e.g., slave, master replicas, and a client of a data volume). The configuration and/or placement with respect to these multiple copies or participants may be represented by individual bit values in the bit vector. For instance, a bit value may describe whether all of the copies are implemented on servers at different server racks.

As indicated at 620, a resource may be identified for migration based on the bit vectors maintained for the current placements. For example, selection criteria may be implemented to identify those resources for which migration is most desirable by examining whether more significant bit values in the bit vectors are set. Consider a technique that first examines the most significant bit in the bit vector for each resource. A listing of those resources that do not have the most significant bit set in the bit vector (and those do not have the heaviest weighted placement criteria satisfied) may be created, so that one of the resources from the list may be identified for migration. Such selection criteria may be dynamically changed, as discussed below with regard to FIG. 9.

As indicated at 630, possible placement(s) for the resource may be identified. For example, the various placement recommendation techniques discussed above with regard to FIG. 3, including various scoring mechanisms and other techniques with respect to the placement criteria, may be implemented to providing a set of possible placement(s) for the resource. As indicated at 640, bit vector(s) may be generated for the possible placement(s) according to the placement criteria. For example, each criterion of placement criteria may be evaluated with respect to resource host metadata and other information (e.g., information obtained from resources hosts, such as by placement data collection 320, and that is stored in a data store, such as volume/service state 322 in FIG. 3 and a respective bit value generated so that the bit vector for each possible placement may be assembled according to the same mapping of bit values to placement criteria as used to generate the bit vectors maintained for the currently placed resources.

As indicated at 650, the bit vector for the current placement of the resource may be compared with the bit vector(s) for the possible placement(s) of the resource, in various embodiments. For example, difference values may be calculated between a numeric representation of the bit vector for the current placement and numeric representations of the possible placement(s). An improved placement may be identified, as indicated at 660 according to the comparison. For instance, if the calculated difference value is negative when subtracting the current placement representation from the possible placement representation, then the possible placement is not an improvement whereas a positive difference value would indicate an improved placement (as more significant bits for the bit vector would be set (and thus higher weighted criterion satisfied) of the possible placement resulting in a greater numeric representation for the possible placement, leading to a positive difference between the current and possible placements). For example a bit vector of "1 0 0 0 0 0 0 0" for a current placement could be transformed into a decimal format of "128" and a bit vector of "0 0 1 0 0 1 1 1" for a decimal value of "39." Subtracting the current placement value from the possible placement value would be negative (39−128=−89). So even though 4 different placement criteria were satisfied (as indicated by the 4 set bits) in the possible placement bit vector, compared with the 1 placement criteria satisfied for the current placement, the possible placement would not be considered an improvement. Other comparisons, such as comparisons performed by masking bits (e.g., masking less significant bits to perform bitwise comparison operations) or other operations to determine whether a bit vector for a possible placement indicates an improved placement may be performed (e.g., without transforming the bit vector), and thus the previous examples are not intended to be limiting.

In some embodiments, improvement thresholds may be implemented so that migrations are not performed that only marginally improve the placement of a resource. In this way, resources to perform migrations are preserved for migrations that provide a greater return in placement benefits. For the improvement threshold may act as an initial cost-benefit analysis decision, only identifying those resources as resources for migration that would experience great placement improvement if selected and the migration performed. The improvement threshold may also be implemented to determine whether or not a candidate migration would improve optimization of resources of the distributed system as a whole. For example, bit vectors may also be used to evaluate the amount of improvement provided by a possible placement with respect to the improvement threshold. A difference value calculated between the two bit vectors may have to exceed a minimum value (e.g., greater than 50), for instance in order to be considered a placement above the improvement threshold. Similar to improvement thresholds, when selecting from amongst multiple possible placements, the difference value may be used to select the greatest improvement from a current location by selecting the possible placement with the greatest positive difference value.

If an improved placement for the resource is identified, as indicated by the positive exit from 660, then as indicated at 670, the resource may be identified for migration to the possible placement. For example, as discussed above with regard to FIG. 3, identified resources may have a corresponding migration operation entry entered into a migration queue or other data structure for scheduling migration operations. In some embodiments, a migration operation may be initiated for the resource when the improved placement for the resource is identified.

The technique described above may be repeatedly performed in order to continuously identify migrations that improve the placement of resources in a distributed system according to placement criteria. In this way, migration operations may be performed over time improve the placement of resources in the distributed system overall. Similar techniques may be performed to initially place resources that are not currently placed (e.g., new resources). For example, possible placements for a new resource may be identified according to the techniques described above at element 630. Then bit vectors may be generated for the possible placements, as indicated at element 640. A best placement may be determined by comparing the different bit vectors. For instance, the bit vectors may be converted into a numerical format (e.g., decimal format) and the highest/largest placement value may be selected as the best placement as the strict weighting schema imposed on the order of bit values in the bit vector may ensure that the higher a value the higher weighted (more significant bit values) criteria are satisfied.

Figure 7:
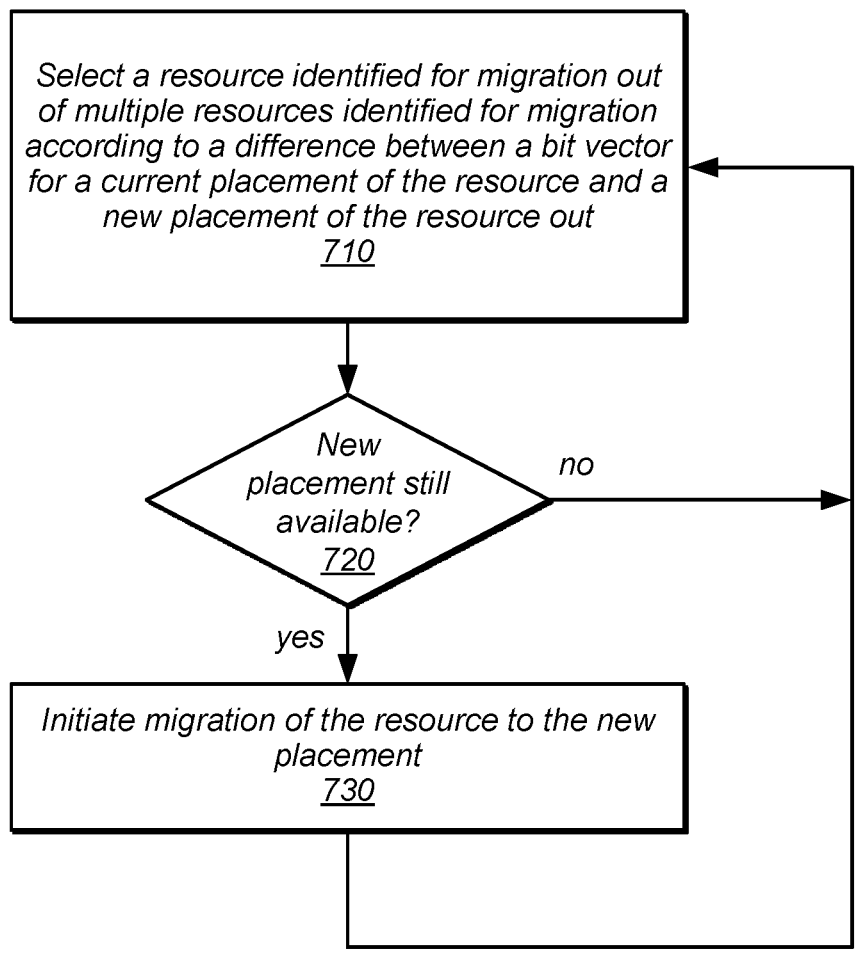
FIG. 7 is a high-level flowchart illustrating various methods and techniques for initiating migration for resources according to bit vector analysis, according to some embodiments.

As noted above, resources may be selected for migration in order to improve the placement of resources in a distributed system. Bit vectors may be analyzed in order to determine which resource to select for potential migration. Moreover, bit vectors may also be analyzed to determine a priority in which identified migrations may be performed. In this way, the most beneficial migrations may be performed before less beneficial migrations. FIG. 7 is a high-level flowchart illustrating various methods and techniques for initiating migration for resources according to bit vector analysis, according to some embodiments. As indicated at 710, a resource identified for migration may be selected out of multiple resources identified for migration according to a difference between the bit vector for the current placement and a new placement for the resource. For example, the identified resources may be maintained in a queue, list, or other data structure along with information describing the resource, such as the current placement and new placement identified for the resource. Additionally, a difference value, such as the difference value discussed above with regard to elements 650 and 660 may be maintained. The identified resource placements may be sorted or ordered according to the difference value so that resources with greater difference values are selected first for a migration operation (e.g., a priority queue for resources utilizing the difference value as a priority value).

Once selected, a check is made to determine if the new placement is still available for hosting the resource, as indicated at 720. As resource migrations and initial placements may be performed in parallel (e.g., by multiple migration/placement workers), some new placements may no longer be available or as optimal. If the new placement is still available, as indicated by the positive exit from 720, then migration of the resource to the new placement may be initiated, as indicated at 730. For example, in some embodiments, migration of the resource may be performed by directing a current resource host to transfer the resource to another resource host that is the new placement. In some embodiments, an intermediary, such as worker(s) 340 in FIG. 3 may direct and/or receive the resource before sending the resource to the destination resource host. In at least some embodiments, the resource may not be physically migrated, but logically migrated (e.g., disabling or removing the resource from a current host and instantiating or creating the resource at the destination host).

Figure 8:
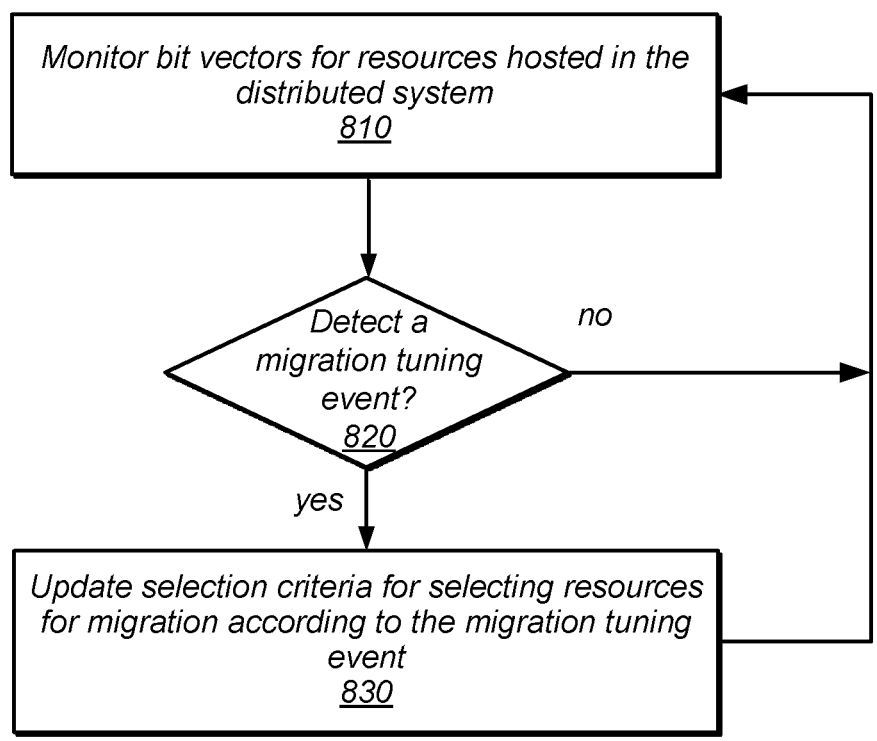
FIG. 8 is a high-level flowchart illustrating various methods and techniques for dynamically adjusting selection criteria for performing resource migration according to bit vector analysis, according to some embodiments.

Bit vector analysis may provide opportunities to tune the performance of migration and initial placement operations. As discussed above with regard to FIG. 5, for example, the bit mapping information, may be modified to change the placement criteria, mapped to bit values (substituting new placement criteria, adding or removing placement criteria, or changing the ordering of placement criteria). In addition to modifying the bit mapping information to tune the operation of migration and other placement decisions, the resources that are selected for migration may also be selected according to criteria that may be tuned in response to analyzing bit vectors. FIG. 8 is a high-level flowchart illustrating various methods and techniques for dynamically adjusting selection criteria for performing resource migration according to bit vector analysis, according to some embodiments.

As indicated at 810, bit vectors for resources hosted in the distributed system may be monitored, in various embodiments. For example, different statistics may be generated and monitored based on the bit vectors, such as the percentage of total resources that have particular bit values in the bit vectors set. In some embodiments, the rate at which certain bit values in the bit vectors become set may be monitored, such as the rate at which the most significant bit value is set. The monitoring of the bit vectors may, in various embodiments, be compared with different conditions (e.g., thresholds) which may trigger the detection of a migration tuning event, as indicated at 820. Consider the percentage of total resources with particular bit values set example given above, if the percentage is not above a threshold value (e.g., above 80%), then a migration tuning event may be triggered to increase the selection of resources that do not have the particular bit values set in order to find new placements where the particular bit values are set. Thus, as indicated at 830, selection criteria for selection resources for migration may be updated according to the migration tuning event. For instance, the selection criteria may be changed such that only those resources with the particular bit values not set are selected for migration according to the techniques described above with regard to FIGS. 6 and 7. In this way, selecting resources for migration can be dynamically tuned according to the state of resource placements as described by bit vectors for the resource placements.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 9:
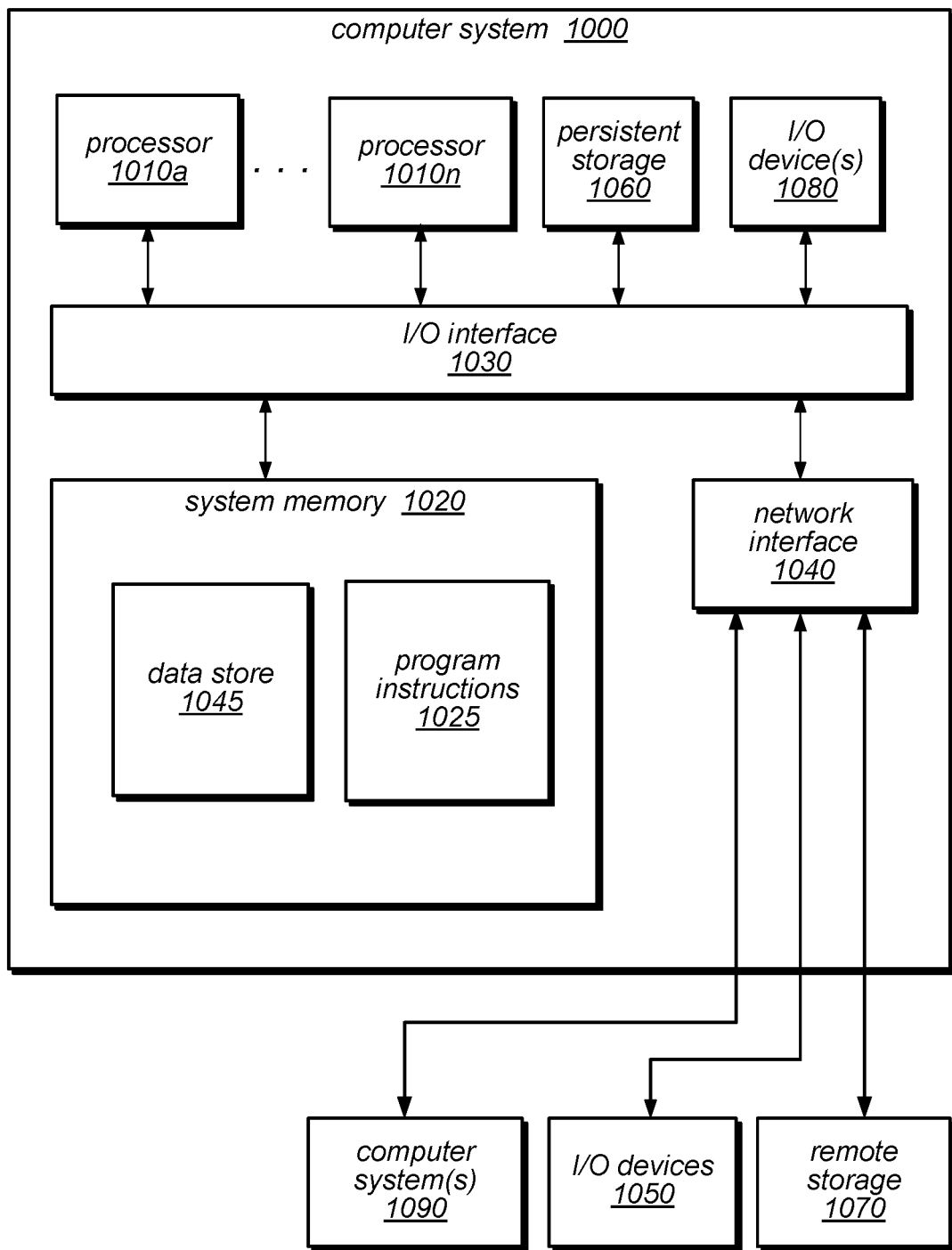
FIG. 9 is a block diagram illustrating an example computing system, according to some embodiments.

Embodiments of bit vector analysis for resource placement as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as JavaTM byte-code, or in any other language such as C/C++, JavaTM, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, SolarisTM, MacOSTM, WindowsTM, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
a plurality of compute nodes, each comprising at least one processor and a memory, configured to implement:
a plurality of resource hosts for the distributed system; and
a control plane, separate from the resource hosts, that includes a migration manager;
the migration manager, configured to:
access bit vectors that describe current placements of a plurality of resources hosted in the distributed system at the plurality of resources hosts according to placement criteria, wherein individual bit values in the bit vector indicate whether a corresponding one of the placement criteria is satisfied;
based on the bit vectors, identify a resource of the plurality of resources to migrate from the current placement of the resource;
determine a possible placement for the resource in the distributed system;
generate another bit vector for the possible placement according to the placement criteria;
compare the bit vector for the current placement of the resource with the other bit vector to determine that the possible placement improves the current placement of the resource according to the placement criteria; and
in response to the determination that the possible placement improves the current placement of the resource, initiate migration of the resource from the current placement to the possible placement.

2. The system of claim 1, wherein to compare the bit vector for the current placement of the resource with the other bit vector, the migration manager is configured to calculate a difference value between the bit vector and the other bit vector, wherein the determination that the possible placement improves the current placement according to the placement criteria is based on the difference value.

3. The system of claim 1, wherein to identify a resource of the plurality of resources to migrate from the current placement of the resource, the migration manager is configured to evaluate one or more bit values of the bit vector for the resource.

4. The system of claim 1, wherein the distributed system is a network-based storage service implemented as part of a provider network, wherein the resource is a data volume persisted in the network-based storage service on behalf of a client of the network-based storage service, and wherein the client of the network-based storage service is a virtual compute instance hosted at a network-based virtual compute service implemented as part of the provider network.

5. A method, comprising:
performing, by one or more computing devices:
for migrating a resource from a current placement to a different placement at one or more resource hosts of a plurality of resource hosts in a distributed system:
determining, by a migration manager separate from the plurality of resource hosts, a bit vector that describes the current placement according to a plurality of placement criteria, wherein individual bit values in the bit vector indicates whether a corresponding one of the placement criteria is satisfied;
identifying, by the migration manager, a possible placement for the resource;
generating, by the migration manager, another bit vector that describes the possible placement according to the plurality of placement criteria;
comparing, by the migration manager, the bit vector for the current placement with the other bit vector for the possible placement to determine that the possible placement for the resource improves the current placement of the resource according to the placement criteria; and
in response to determining that the possible placement for the resource improves the current placement of the resource, initiating, by the migration manager, a migration of the resource from the current placement to the possible placement in the distributed system.

6. The method of claim 5, wherein comparing the bit vector for the current placement with the other bit vector for the possible placement comprises calculating a difference value between the bit vector and the other bit vector, wherein the determination that the possible placement improves the current placement according to the placement criteria is based on the difference value.

7. The method of claim 5, further comprising:
maintaining bit vectors that describe current placements of a plurality of resources including the resource hosted in the distributed system at the plurality of resources hosts according to placement criteria; and
identifying the resource for migration based on selection criteria applied to the bit vectors for the plurality of resources.

8. The method of claim 7, further comprising:
monitoring the bit vectors maintained for the plurality of resources to detect a migration tuning event;
in response to detecting the migration tuning event, updating the selection criteria according to the migration tuning event; and
identifying another resource for migration based on the updated selection criteria applied to the bit vectors for the plurality of resources.

9. The method of claim 5, wherein the bit vector is generated according to a bit mapping that links different ones of the placement criteria to bit values, and wherein the method further comprises:
receiving a request to modify the bit mapping;
in response to the request, modifying the bit mapping;
for migrating another resource from a current placement to a different placement at one or more resource hosts of the plurality of resource hosts in the distributed system:
determining a bit vector that describes the current placement of the other resource according to the modified bit mapping;
identifying a possible placement for the other resource;
generating another bit vector that describes the possible placement for the other resource according to the modified bit mapping; and
comparing the bit vector for the current placement of the other resource with the other bit vector for the possible placement other resource to determine whether the possible placement for the resource improves the current placement of the other resource according to the placement criteria.

10. The method of claim 9, wherein modifying the bit mapping changes an ordering of the placement criteria with respect to bit values of bit vectors.

11. The method of claim 5, further comprising:
maintaining bit vectors that describe current placements of a plurality of resources including the resource hosted in the distributed system at the plurality of resources hosts according to placement criteria; generating one or more placement health indicators for the distributed system based on the bit vectors; and
providing the one or more placement health indicators.

12. The method of claim 5, further comprising:
for initially placing another resource at one or more resource hosts of a plurality of resource hosts in a distributed system:
identifying a plurality of possible placements for the other resource;
generating respective bit vectors for the plurality of possible placements according to the placement criteria; and
based on the respective bit vectors, selecting one of the possible placements for placing the other resource.

13. The method of claim 5, wherein the resource is a distributed resource hosted at different ones of the resource hosts, wherein at least one of the placement criteria describes a placement configuration for the distributed resource at the different resources, and wherein the migration to the possible placement moves the distributed resource from at least one of the different resource hosts to change the placement configuration for the distributed resource.

14. A non-transitory, computer-readable storage medium, storing program instructions that when executed by one or more computing devices cause the one or more computing devices to implement a migration manager for a distributed system:
identifying a resource hosted in the distributed system for migration from a current placement to a different placement at one or more resource hosts of a plurality of resource hosts in a distributed system that are implemented separate from the migration manager;

determining a bit vector that describes the current placement according to a plurality of placement criteria, wherein individual bit values in the bit vector indicate whether a corresponding one of the placement criteria is satisfied;

obtaining a possible placement for the resource;

generating another bit vector that describes the possible placement according to the plurality of placement criteria;

comparing the bit vector for the current placement with the other bit vector for the possible placement to determine that the possible placement for the resource improves the current placement of the resource according to the placement criteria; and in response to determining that the possible placement for the resource improves the current placement of the resource, initiating a migration of the resource from the current placement to the possible placement in the distributed system.

15. The non-transitory, computer-readable storage medium of claim 14, wherein the program instructions cause the one or more computing devices to further implement maintaining bit vectors that describe current placements of a plurality of resources including the resource hosted in the distributed system at the plurality of resources hosts according to placement criteria; and wherein, in identifying the resource for migration, the program instructions cause the one or more computing devices to implement evaluating one or more bit values of the bit vectors maintained for the resources.

16. The non-transitory, computer-readable storage medium of claim 14, wherein, in comparing the bit vector for the current placement with the other bit vector for the possible placement, the program instructions cause the one or more computing devices to implement calculating a difference value between the bit vector and the other bit vector, wherein the determination that the possible placement improves the current placement according to the placement criteria is based on the difference value.

17. The non-transitory, computer-readable storage medium of claim 14, wherein the program instructions cause the one or more computing devices to further implement:

maintaining bit vectors that describe current placements of a plurality of resources including the resource hosted in the distributed system at the plurality of resources hosts according to placement criteria;

generating one or more placement health indicators for the distributed system based on the bit vectors; and providing the one or more placement health indicators.

18. The non-transitory, computer-readable storage medium of claim 14, wherein the bit vector is generated according to a bit mapping that links different ones of the placement criteria to bit values, and wherein the program instructions cause the one or more computing devices to further implement: receiving a request to modify the bit mapping;

in response to the request, modifying the bit mapping;

for migrating another resource from a current placement to a different placement at one or more resource hosts of the plurality of resource hosts in the distributed system:

determining a bit vector that describes the current placement of the other resource according to the modified bit mapping;

identifying a possible placement for the other resource;

generating another bit vector that describes the possible placement for the other resource according to the modified bit mapping; and comparing the bit vector for the current placement of the other resource with the other bit vector for the possible placement other resource to determine whether the possible placement for the resource improves the current placement of the other resource according to the placement criteria.

19. The non-transitory, computer-readable storage medium of claim 18, modifying the bit mapping performs at least one of adding or removing a placement criteria mapped to a bit value.

20. The non-transitory, computer-readable storage medium of claim 14, wherein the distributed system is a network-based storage service implemented as part of a provider network, wherein the resource is a data volume persisted in the network-based storage service on behalf of a client of the network-based storage service, wherein the data volume comprises a master replica and at least one slave replica.

* * * * *